(12) United States Patent
Cho et al.

(10) Patent No.: US 9,316,777 B2
(45) Date of Patent: Apr. 19, 2016

(54) BACKLIGHT ASSEMBLY AND DISPLAY APPARATUS HAVING THE SAME

(71) Applicant: SAMSUNG DISPLAY CO., LTD., Yongin, Gyeonggi-Do (KR)

(72) Inventors: Hyun-Min Cho, Hwaseong-si (KR); Kwang-Keun Lee, Osan-si (KR); Jong-Hyuk Kang, Suwon-si (KR); Jae-Byung Park, Seoul (KR); Baek-Hee Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 29 days.

(21) Appl. No.: 14/313,982

(22) Filed: Jun. 24, 2014

(65) Prior Publication Data

US 2015/0130693 A1  May 14, 2015

(30) Foreign Application Priority Data

Nov. 8, 2013  (KR) .......................... 10-2013-0135889

(51) Int. Cl.
| | |
|---|---|
| *G09G 3/36* | (2006.01) |
| *F21V 8/00* | (2006.01) |
| *G02F 1/1335* | (2006.01) |
| *G09G 3/20* | (2006.01) |
| *G09G 3/34* | (2006.01) |

(52) U.S. Cl.
CPC ............ *G02B 6/0026* (2013.01); *G02B 6/0001* (2013.01); *G02B 6/0073* (2013.01); *G02F 1/133603* (2013.01); *G09G 3/2025* (2013.01); *G09G 3/3426* (2013.01); *G02F 2001/133614* (2013.01); *G02F 2202/36* (2013.01); *G09G 3/3648* (2013.01); *G09G 2310/0237* (2013.01); *G09G 2320/064* (2013.01)

(58) Field of Classification Search
CPC ......... G09G 5/02; G09G 3/26; G09G 3/3406; G09G 3/36; G09G 3/3648; G09G 2310/0237; G09G 2320/064; G02F 1/133603; G02B 6/0026; G02B 6/0073; F21K 9/56
See application file for complete search history.

(56) References Cited

U.S. PATENT DOCUMENTS

| | | | |
|---|---|---|---|
| 8,084,934 B2 | 12/2011 | Kim et al. | |
| 8,164,261 B2 | 4/2012 | Furutani et al. | |
| 2006/0072339 A1* | 4/2006 | Li | G02B 6/0013 362/608 |

(Continued)

FOREIGN PATENT DOCUMENTS

| | | |
|---|---|---|
| KR | 10-0991904 B1 | 11/2010 |
| KR | 10-2011-0044002 A | 4/2011 |

(Continued)

OTHER PUBLICATIONS

Korean Patent Abstracts, Publication No. 1020090064079 A, dated Jun. 18, 2009, for corresponding Korean Patent No. KR 10-0991904 B1, listed above, 1 page.

*Primary Examiner* — Joe H Cheng
(74) *Attorney, Agent, or Firm* — Lewis Roca Rothgerber Christie LLP

(57) ABSTRACT

A backlight assembly having a light emitting module and a lower receiving container, the light emitting module including a first light source configured to generate a first light and a quantum dot rail configured to generate a second light from the first light the light emitting module is disposed under a display panel to provide the display panel with the second light, and the lower receiving container is configured to receive the light emitting module and the display panel.

20 Claims, 14 Drawing Sheets

(56) References Cited

U.S. PATENT DOCUMENTS

| | | | |
|---|---|---|---|
| 2007/0171669 A1* | 7/2007 | Lee | G02F 1/133603 362/600 |
| 2008/0101084 A1* | 5/2008 | Hsu | G02B 6/0023 362/612 |
| 2008/0205080 A1* | 8/2008 | Erchak | G02B 6/0085 362/613 |
| 2010/0026703 A1* | 2/2010 | Parker | G02B 6/0046 345/589 |
| 2010/0155749 A1 | 6/2010 | Chen et al. | |
| 2011/0007520 A1* | 1/2011 | Shigeta | G02B 6/0053 362/607 |
| 2011/0063875 A1* | 3/2011 | Yang | G02B 6/0023 362/621 |
| 2011/0141769 A1 | 6/2011 | Lee et al. | |
| 2012/0154417 A1* | 6/2012 | Ninan | G02B 27/2264 345/581 |
| 2012/0154464 A1* | 6/2012 | Ninan | G02B 27/2264 345/691 |
| 2012/0155060 A1* | 6/2012 | Ninan | G02B 27/2264 362/84 |
| 2012/0206935 A1* | 8/2012 | Seo | G02B 6/0023 362/602 |
| 2012/0281151 A1* | 11/2012 | Abe | G02B 6/0091 348/739 |
| 2013/0010229 A1* | 1/2013 | Shin | G02F 1/1336 349/62 |
| 2013/0037778 A1 | 2/2013 | Kazlas et al. | |
| 2013/0050612 A1 | 2/2013 | Hur et al. | |
| 2013/0128614 A1* | 5/2013 | Lee | G02B 6/0023 362/609 |
| 2013/0128617 A1* | 5/2013 | Lee | F21S 8/00 362/611 |
| 2013/0148376 A1* | 6/2013 | Nick | G02B 6/0001 362/559 |
| 2015/0023055 A1* | 1/2015 | Hwang | G02B 6/0025 362/608 |
| 2015/0214445 A1* | 7/2015 | Qiu | H01L 27/15 257/88 |
| 2015/0219822 A1* | 8/2015 | Lee | G02B 6/0026 362/608 |
| 2015/0226904 A1* | 8/2015 | Bae | G02B 6/0026 362/608 |
| 2015/0253482 A1* | 9/2015 | Seo | G02B 6/0026 362/608 |
| 2015/0253625 A1* | 9/2015 | Lee | G02F 1/133621 349/62 |

FOREIGN PATENT DOCUMENTS

| | | |
|---|---|---|
| KR | 10-2012-0075015 A | 7/2012 |
| KR | 10-2012-0085816 A | 8/2012 |
| KR | 10-2012-0133062 A | 12/2012 |

\* cited by examiner

BACKLIGHT ASSEMBLY AND DISPLAY APPARATUS HAVING THE SAME

CROSS-REFERENCE TO RELATED APPLICATION

This application claims priority to and the benefit of Korean Patent Application No. 10-2013-0135889, filed on Nov. 8, 2013 in the Korean Intellectual Property Office (KIPO), the entire content of which is herein incorporated by reference.

BACKGROUND

1. Field

The present invention relates to a backlight assembly and a display apparatus having the same. More particularly, the present invention relates to a backlight assembly providing light to a display panel displaying an image and a display apparatus having the same.

2. Description of the Related Art

A liquid crystal display apparatus includes a liquid crystal display panel, a gate driving part, a data driving part and a timing controlling part.

The liquid crystal display panel includes a lower substrate including a thin film transistor and a pixel electrode, an upper substrate including a common electrode, and a liquid crystal layer disposed between the lower substrate and the upper substrate and including a liquid crystal of whose arrangement is changed due to an electric field between a pixel voltage applied to the pixel electrode and a common voltage applied to the common electrode.

The liquid crystal display panel is a non-light emitting device, and thus the liquid crystal display apparatus needs a backlight assembly providing light to the liquid crystal display panel.

Recently, a backlight assembly using a quantum dot to provide light to the liquid crystal display has been developed.

The backlight assembly including the quantum dot includes a light source generating an exitation light, a quantum rail generating a white light from the exitation light, and a light guide plate including a side surface receiving the white light and an upper surface outputting the white light received through the side surface.

Therefore, the light source and the quantum dot rail face the side surface of the light guide plate. Thus, a width of a bezel of the liquid crystal display apparatus is increased.

SUMMARY

Exemplary embodiments of the present invention provide a backlight assembly capable of decreasing a width of a bezel of a display apparatus.

Exemplary embodiments of the present invention also provide a display apparatus having the above-mentioned backlight apparatus.

According to an exemplary embodiment of the present invention, a backlight assembly includes a light emitting module and a lower receiving container. The light emitting module includes a first light source configured to generate a first light and a quantum dot rail configured to generate a second light from the first light. The light emitting module is disposed under a display panel to provide the display panel with the second light. The display panel is configured to display an image. The lower receiving container is configured to receive the light emitting module and the display panel.

In one embodiment, the light emitting module may further include a holding portion configured to hold the first light source and the quantum dot rail and having an opening facing the display panel.

In one embodiment, a plurality of the light emitting modules may be provided, the backlight assembly may include light emitting blocks respectively corresponding to the light emitting modules, and the light emitting modules may be driven in a dimming driving method.

In one embodiment, the light emitting module may include a plurality of the first light sources and a plurality of the quantum dot rails respectively disposed on the first light sources.

In one embodiment, currents of light source driving signals respectively driving the first light sources may be controlled.

In one embodiment, pulse widths of light source driving signals respectively driving the first light sources may be controlled.

In one embodiment, the first light may be a blue light.

In one embodiment, the second light may be a white light.

In one embodiment, the backlight assembly may further include a second light source generating the white light.

In one embodiment, the second light source and the first light source may be sequentially driven.

In one embodiment, the second light source may be driven in a first sub frame displaying a gray sub frame image data having a minimum value of red, green and blue data of an image data.

In one embodiment, the first light source may be driven in a second sub frame displaying a color sub frame image data except for the gray sub frame image data in the image data.

In one embodiment, the first light may be an ultraviolet light and the second light may be a yellow light.

In one embodiment, the backlight assembly may further include a second light source generating a blue light.

According to another exemplary embodiment of the present invention, a backlight assembly includes a light emitting module, a light guide plate and a lower receiving container. The light emitting module includes a first light source configured to generate a first light and a quantum dot rail configured to generate a second light from the first light. The light guide plate includes a side surface configured to receive the second light and an exiting surface configured to exit the second light received through the side surface. The lower receiving container is configured to receive the light emitting module, the light guide plate and a display panel. The display panel is configured to receive the second light to display an image.

In one embodiment, the backlight assembly may further include a second light source generating a white light, and the first light may be a blue light and the second light may be the white light.

In one embodiment, the backlight assembly may further include a second light source generating a blue light, and the first light may be an ultraviolet light and the second light may be a yellow light.

According to still another exemplary embodiment of the present invention, a display apparatus includes a display panel and a backlight assembly. The display panel displays an image. The backlight assembly includes a light emitting module including a first light source configured to generate a first light and a quantum dot rail configured to generate a second light from the first light and is disposed under the display panel to provide the display panel with the second light, and a lower receiving container configured to receive the light emitting module and the display panel.

In one embodiment, the first light may be a blue light, the second light may be a white light, and the backlight assembly may further include a second light source generating the white light.

In one embodiment, the first light may be an ultraviolet light, the second light may be a yellow light, and the backlight assembly may further include a second light source generating a blue light.

According to the present invention, a light emitting module including a quantum dot rail is disposed under a display panel, and thus a width of a bezel of a display apparatus may be decreased.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION

Hereinafter, the present invention will be explained in detail with reference to the accompanying drawings.

Figure 1:
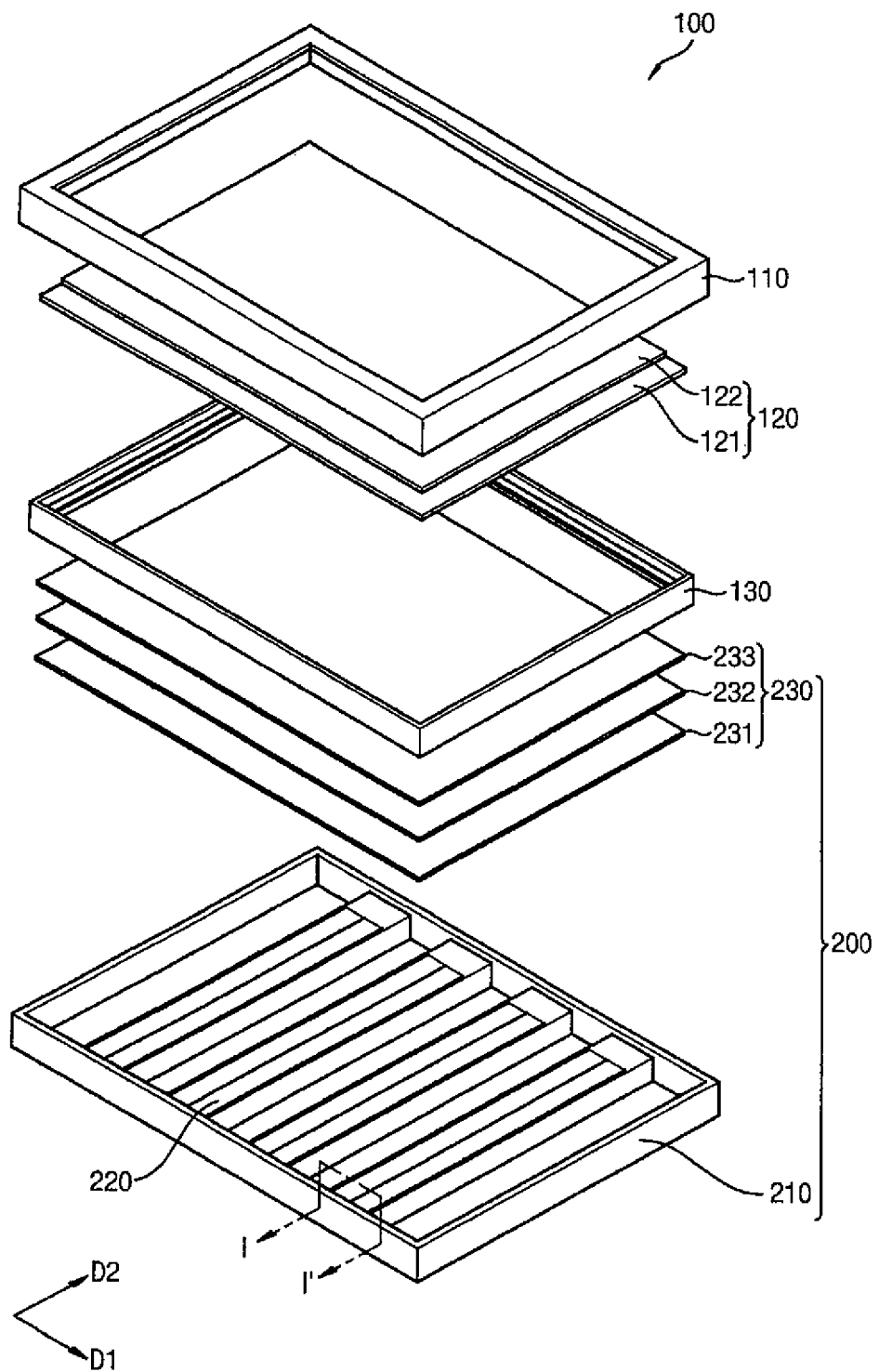
FIG. 1 is an exploded perspective view illustrating a display apparatus according to an exemplary embodiment of the present invention.
Figure 2:
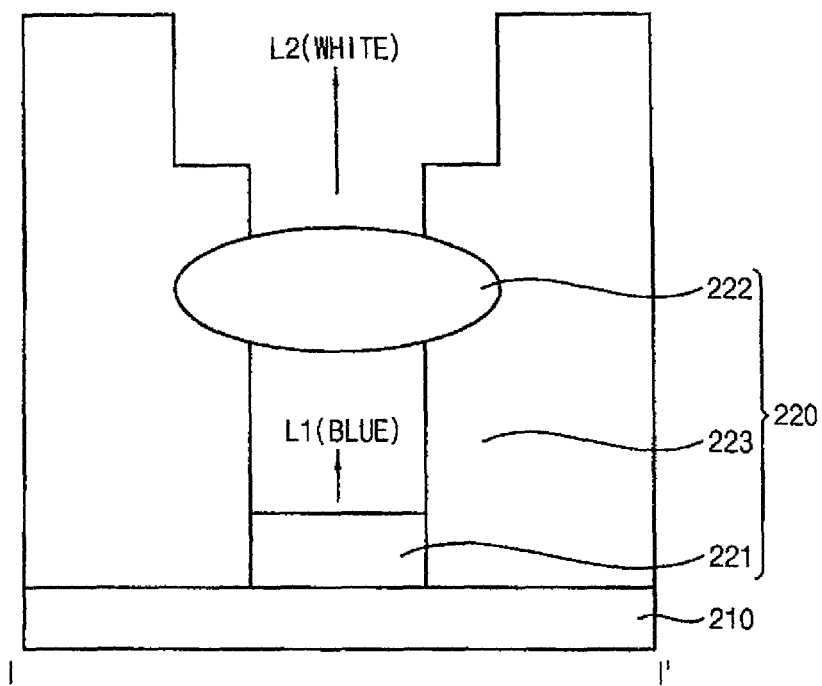
FIG. 2 is a cross-sectional view taken along a line I-I' of FIG. 1.

FIG. 1 is an exploded perspective view illustrating a display apparatus according to an exemplary embodiment of the present invention, and FIG. 2 is a cross-sectional view taken along a line I-I' of FIG. 1.

Referring to FIGS. 1 and 2, the display apparatus 100 according to the present exemplary embodiment includes an upper receiving container 110, a display panel 120 and a backlight assembly 200.

The upper receiving container 110 is disposed over the display panel 120 to protect the display panel 120 from an external impact, and a window is formed through the upper receiving container 110 to expose a display area of the display panel 120. The upper receiving container 110 includes an upper portion covering a portion of the display panel 120, and a side wall vertically extending from the upper portion.

The display panel 120 includes a lower substrate 121, an upper substrate 122 and a liquid crystal layer (not shown). The lower substrate 121 or the upper substrate 122 may include a color filter. The lower substrate 121 includes a first base substrate, a thin-film transistor and a pixel electrode. The upper substrate 122 faces the lower substrate 121, and includes a second base substrate and a common electrode. The liquid crystal layer is disposed between the lower substrate 121 and the upper substrate 122, and a liquid crystal of the liquid crystal layer is aligned by an electric field generated between the pixel electrode of the lower substrate 121 and the common electrode of the upper substrate 122. The display panel 120 displays an image using light exiting from a light emitting module 220 included in the backlight assembly 200. The display panel 120 may have a long side in a first direction D1 and may have a short side in a second direction D2 substantially perpendicular to the first direction D1.

The backlight assembly 200 is disposed under the display panel 120 to provide the light to the display panel 120. The backlight assembly 200 includes a lower receiving container 210, a light emitting module 220 and optical sheets 230.

The lower receiving container 210 includes a bottom portion on which the light emitting module 220 is disposed, and a side wall vertically extending from the bottom portion. The lower receiving container 210 is combined with the upper receiving container 110 to receive the light emitting module 220, the optical sheets 230 and the display panel 120.

The light emitting module 220 is disposed under the display panel 120 and generates the light for display panel 120. Thus, the backlight assembly 200 may be a direct type backlight assembly.

Specifically, the light emitting module 220 includes a first light source 221, a quantum dot rail 222 and a holding portion 223.

The first light source 221 generates a first light L1. The first light L1 may be a blue light. For example, the first light source 221 may be a blue light emitting diode (LED) generating the blue light.

The quantum dot rail 222 receives the first light L1, and generates a second light L2 from the first light L1. The second light L2 may be a white light.

The holding portion 223 holds the first light source 221 and the quantum dot rail 222. The holding portion 223 has an opening facing the display panel 120. Thus, the second light L2 may be provided to the display panel 120. For example, the holding portion 223 may include glass material.

There may be a plurality of light emitting modules 220. Thus, the light emitting modules 220 may include a plurality of the first light sources 221 and a plurality of quantum the dot rails 222 respectively disposed on the first light sources 221. For example, each of the light emitting modules 220 may extend in the second direction D2 and may be aligned in the first direction D1. Alternatively, each of the light emitting modules 220 may extend in the first direction D1 and may be aligned in the second direction D2. The light emitting modules 220 may be uniformly spaced from one another.

The optical sheets 230 are disposed over the light emitting module 220 to enhance an efficiency of the second light L2 exited from the light emitting module 220. The optical sheets 230 may include a first optical sheet 231, a second optical sheet 232 and a third optical sheet 233, and for example, respectively, the first optical sheet 231, the second optical sheet 232 and the third optical sheet 233 may be a diffusion sheet, a prism sheet and a light-condensing sheet.

The display apparatus 100 may further include a mold frame 130. The mold frame 130 is disposed between the display panel 120 and the optical sheets 230 to support the display panel 120, and the mold frame 130 fixes the optical sheets 230 to the lower receiving container 210.

Figure 3:
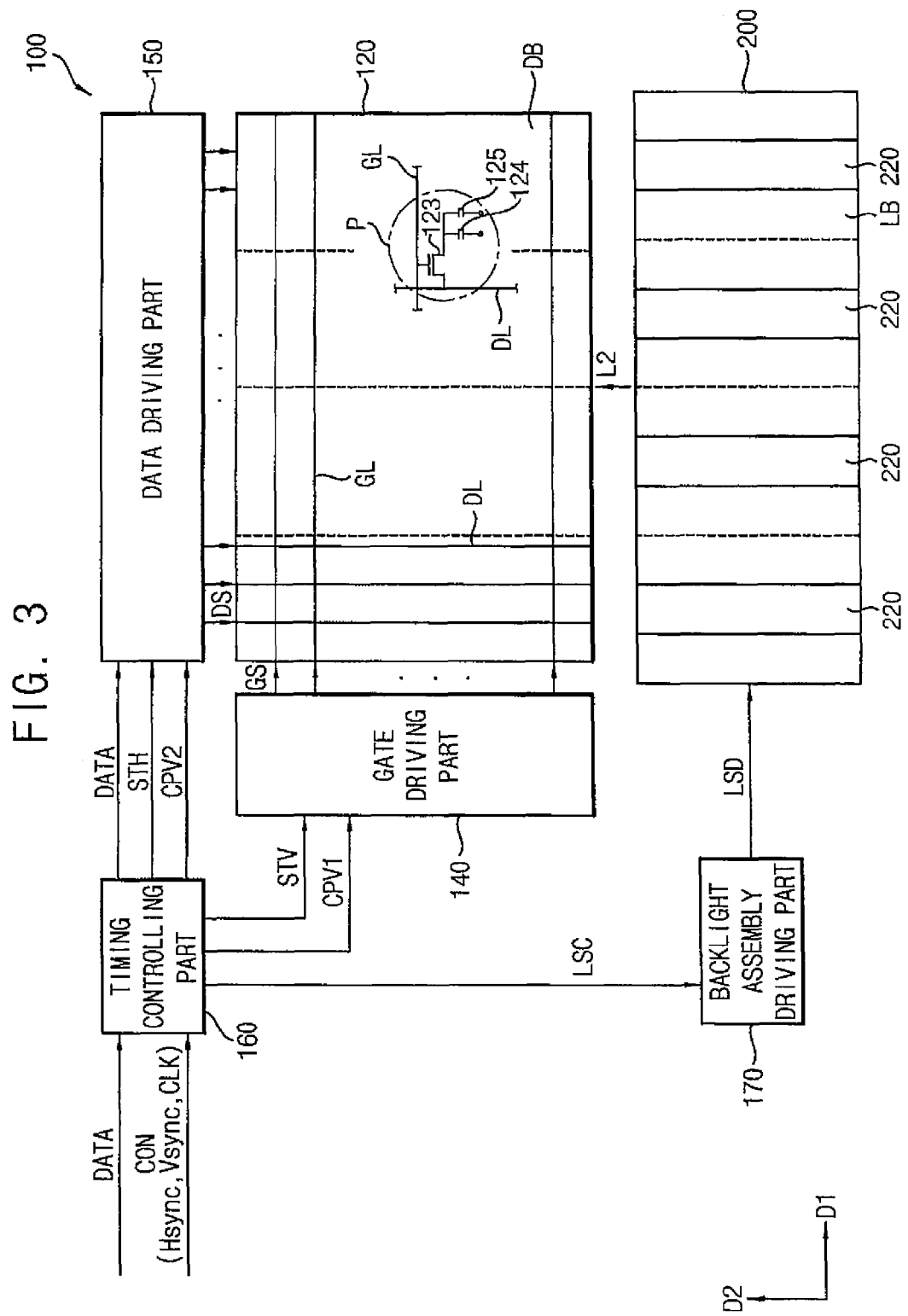
FIG. 3 is a block diagram illustrating the display apparatus of FIG. 1.

FIG. 3 is a block diagram illustrating the display apparatus 100 of FIG. 1.

Referring to FIGS. 1 to 3, the display apparatus 100 includes the display panel 120 and the backlight assembly 200, and may further include a gate driving part 140, a data driving part 150, a timing controlling part 160 and a backlight assembly driving part 170.

The display panel 120 receives a data signal DS based on an image data DATA provided from the timing controlling part 160 to display an image. For example, the image data DATA may be two-dimensional plane image data. Alternatively, the image data DATA may include a left-eye image data and a right-eye image data for displaying a three-dimensional stereoscopic image.

The display panel 120 includes gate lines GL, data lines DL and a plurality of pixels P. The gate line GL extends in the first direction D1 and the data line DL extends in the second direction D2 substantially perpendicular to the first direction D1. Each of the pixels P includes a thin film transistor 123 electrically connected to the gate line GL and the data line DL, a liquid crystal capacitor 124 and a storage capacitor 125 connected to the thin film transistor 123. The display panel 120 includes a display block DB respectively corresponding to light emitting block LB of the backlight assembly 200.

The gate driving part 140 generates a gate signal GS in response to a gate start signal STV and a gate clock signal CPV1 provided from the timing controlling part 160, and outputs the gate signal GS to the gate line GL.

The data driving part 150 outputs the data signal DS to the data line DL in response to a data start signal STH and a data clock signal CPV2 provided from the timing controlling part 160.

The backlight assembly 200 provides the second light L2 to the display panel 120. The backlight assembly 200 includes the light emitting blocks LB respectively corresponding to the light emitting modules 220. When the light emitting modules 220 are disposed in a uniform distance, areas of each of the light emitting blocks LB may be the same.

The timing controlling part 160 receives the image data DATA and a control signal CON from an outside source. The control signal CON may include a horizontal synchronous signal Hsync, a vertical synchronous signal Vsync and a clock signal CLK. The timing controlling part 160 generates the data start signal STH using the horizontal synchronous signal Hsync and outputs the data start signal STH to the data driving part 150. In addition, the timing controlling part 160 generates the gate start signal SW using the vertical synchronous signal Vsync and outputs the gate start signal SW to the gate driving part 140. In addition, the timing controlling part 160 generates the gate clock signal CPV1 and the data clock signal CPV2 using the clock signal CLK, outputs the gate clock signal CPV1 to the gate driving part 140 and outputs the data clock signal CPV2 to the data driving part 150. In addition, the timing controlling part 160 may further output a light source control signal LSC linked with the image data DATA to the backlight assembly driving part 170.

The backlight assembly driving part 170 outputs a light source driving signal LSD to the backlight assembly 200. The backlight assembly driving part 170 may output the light source driving signal LSD according to the light source control signal LSC provided from the timing controlling part 160 to drive each of the first light sources 221 included in the backlight assembly 200.

Specifically, currents of the light driving signals LSD, respectively driving the first light sources 221 according to the light source control signal LSC, may be controlled. For example, the current of the light source driving signal LSD may be increased as a grayscale of the image data corresponding to the display blocks DB is increased. Alternatively, pulse widths of the light driving signals LSD, respectively driving the first light sources 221 according to the light source control signal LSC, may be controlled. For example, the pulse width of the light source driving signal LSD may be increased as the grayscale of the image data corresponding to the display blocks DB is increased. Alternatively, the currents and the pulse widths of the light driving signals LSD, respectively driving the first light sources 221 according to the light source control signal LSC, may be controlled. For example, the current of the light source driving signal LSD and the pulse width of the light source driving signal LSD may be increased as the grayscale of the image data corresponding to the display blocks DB are increased. Thus, the light emitting modules 220 and the backlight assembly 200 may be driven in a dimming method.

According to the present exemplary embodiment, the light emitting module 220 including the quantum dot rail 222 is disposed under the display panel 120, and thus a width of a bezel of the display apparatus 100 may be decreased.

Figure 4:
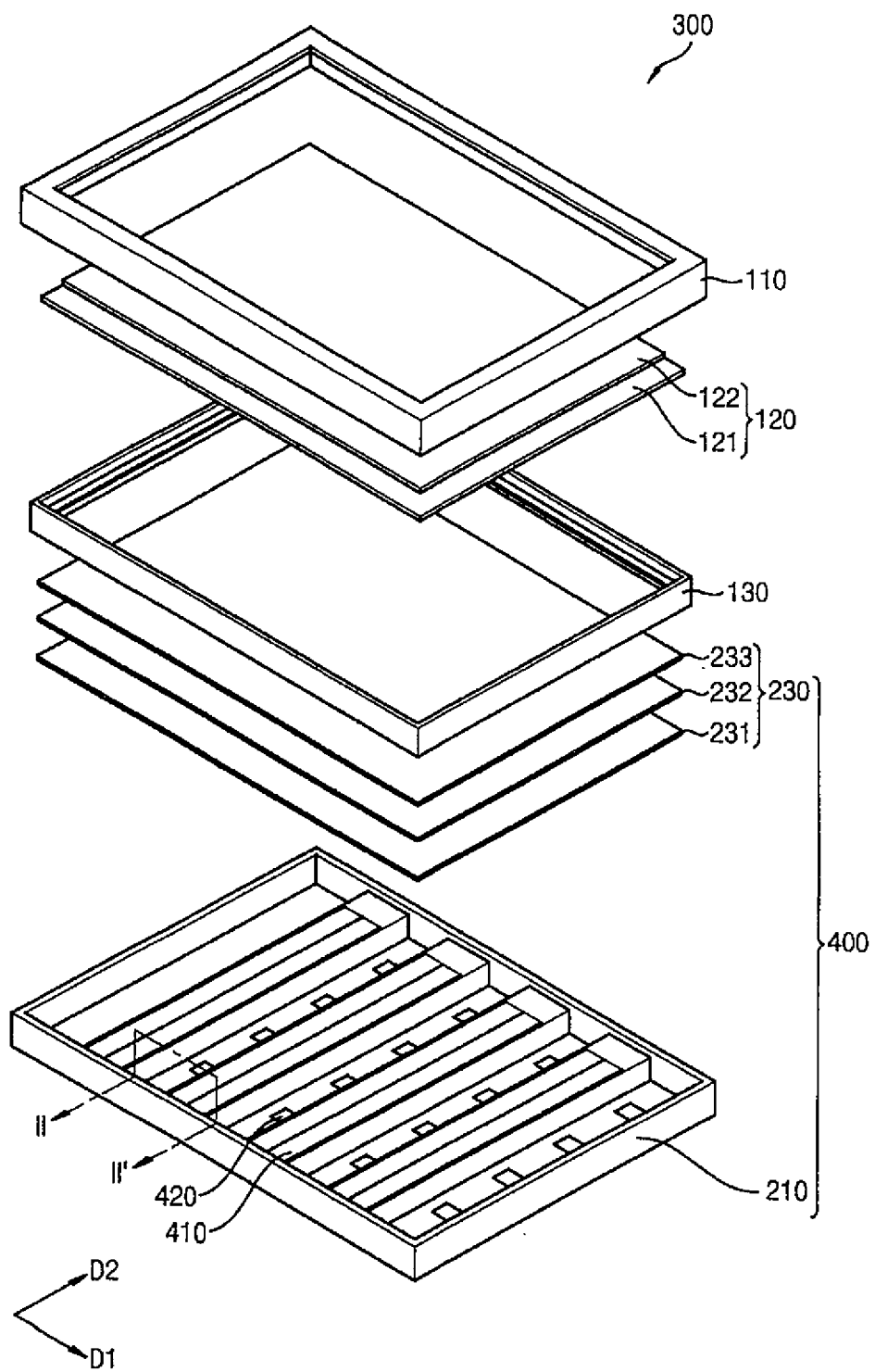
FIG. 4 is an exploded perspective view illustrating a display apparatus according to another exemplary embodiment of the present invention.
Figure 5:
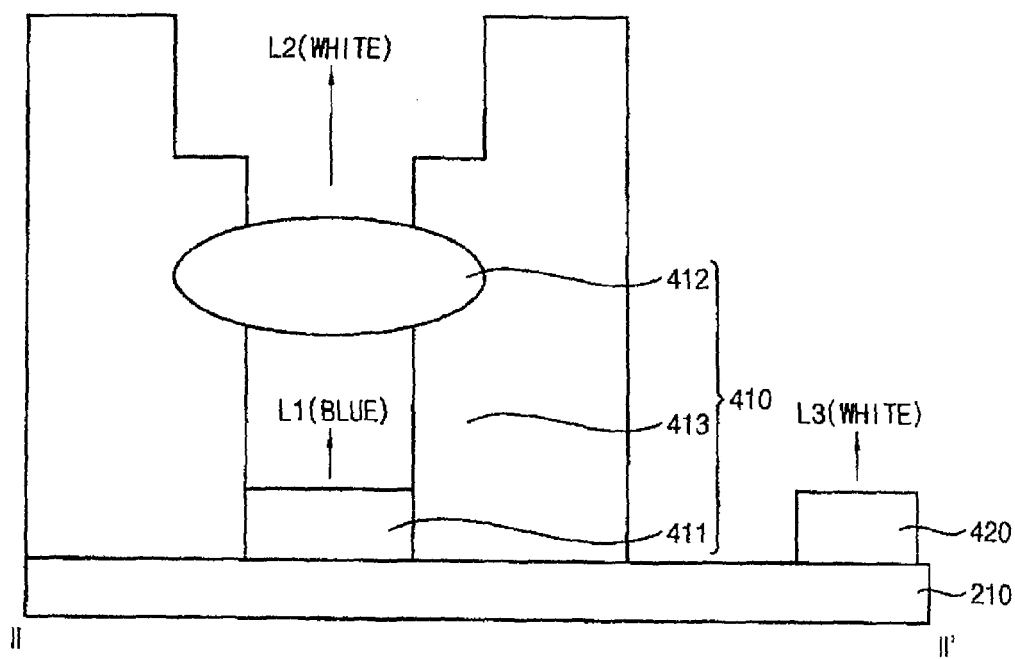
FIG. 5 is a cross-sectional view taken along a line II-II' of FIG. 4.

FIG. 4 is an exploded perspective view illustrating a display apparatus according to another exemplary embodiment of the present invention, and FIG. 5 is a cross-sectional view taken along a line II-II' of FIG. 4.

The display apparatus 300 according to the present exemplary embodiment is substantially the same as the display apparatus 100 according to the previous exemplary embodiment illustrated in FIGS. 1 and 2 except for backlight assembly 400. Thus, the same reference numerals are used to refer to same or like parts as those described in the previous exemplary embodiment and any further repetitive explanation concerning the above elements has been omitted.

Referring to FIGS. 4 and 5, the display apparatus 300 according to the present exemplary embodiment includes the upper receiving container 110, display panel 120 and backlight assembly 400.

The upper receiving container 110 is disposed over the display panel 120 to protect the display panel 120 from external impact, and a window is formed through the upper receiving container 110 to expose the display area of the display panel 120.

The display panel 120 includes the lower substrate 121, the upper substrate 122 and the liquid crystal layer (not shown).

The backlight assembly 400 is disposed under the display panel 120 to provide light to the display panel 120. The backlight assembly 400 includes the lower receiving container 210, a light emitting module 410, a second light source 420 and optical sheets 230.

The lower receiving container 210 is combined with the upper receiving container 110 to receive the light emitting module 410, the second light source 420, the optical sheets 240 and the display panel 120.

The light emitting module 410 is disposed under the display panel 120 and generates the light for the display panel 120. Thus, the backlight assembly 400 may be a direct type backlight assembly.

Specifically, the light emitting module 410 includes a first light source 411, a quantum dot rail 412 and a holding portion 413.

The first light source 411 generates a first light L1. The first light L1 may be a blue light. For example, the first light source 411 may be a blue light emitting diode (LED) generating the blue light.

The quantum dot rail 412 receives the first light L1, and generates a second light L2 from the first light L1. The second light L2 may be a white light.

The holding portion 413 holds the first light source 411 and the quantum dot rail 412. The holding portion 413 has an opening facing the display panel 120. Thus, the second light L2 may be provided to the display panel 120. For example, the holding portion 413 may include glass material.

There may be a plurality of light emitting modules 410. Thus, the light emitting modules 410 may include a plurality of the first light sources 411 and a plurality of the quantum dot rails 412 respectively disposed on the first light sources 411. For example, each of the light emitting modules 410 may extend in the second direction D2 and may be aligned in the first direction D1. Alternatively, each of the light emitting modules 410 may extend in the first direction D1 and may be aligned in the second direction D2. The light emitting modules 410 may be uniformly disposed with respect to one another.

The second light source 420 may be disposed at a side portion of the light emitting module 410. There may be a plurality of second light sources 420. Thus, the backlight assembly 400 may include a plurality of the second light sources 420 corresponding to each of the light emitting modules 410. For example, four second light sources 420 may correspond to each of the light emitting modules 410. The second light source 420 generates a third light L3 to provide the third light L3 to the display panel 120. The third light L3 generated from the second light source 420 may be white light substantially equal to the second light L2. For example, the second light source 420 may be a white light emitting diode (LED) generating the white light.

The optical sheets 230 are disposed over the light emitting module 410 and the second light source 420 to enhance efficiencies of the second light L2 exited from the light emitting module 410 and the third light L3 exited from the second light source 420. The optical sheets 230 may include the first optical sheet 231, the second optical sheet 232 and the third optical sheet 233, and for example, respective the first optical sheet 231, the second optical sheet 232 and the third optical sheet 233 may be the diffusion sheet, the prism sheet and the light-condensing sheet.

The display apparatus 300 may further include the mold frame 130. The mold frame 130 is disposed between the display panel 120 and the optical sheets 230 to support the display panel 120, and the mold frame 130 fixes the optical sheets 230 to the lower receiving container 210.

Figure 6:
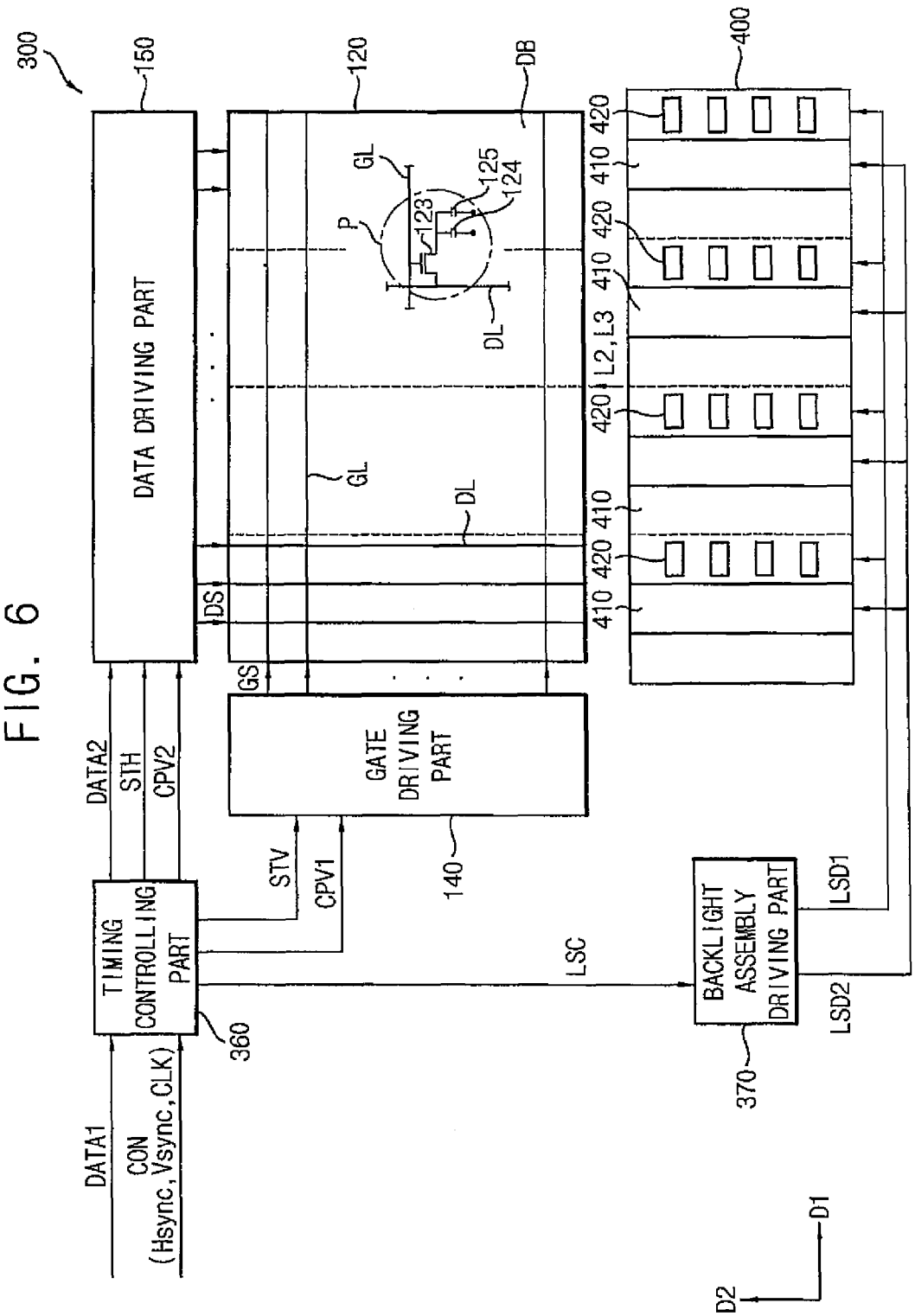
FIG. 6 is a block diagram illustrating the display apparatus of FIG. 4.

FIG. 6 is a block diagram illustrating the display apparatus 300 of FIG. 4.

The display apparatus 300 according to the present exemplary embodiment is substantially the same as the display apparatus 100 illustrated in FIG. 3 except for a timing controlling part 360, a backlight assembly driving part 370 and the backlight assembly 400. Thus, the same reference numerals are used to refer to the same or like parts as those described in the previous embodiment and any further repetitive explanation concerning those elements has been omitted.

Referring to FIGS. 4 to 6, the display apparatus 300 includes the display panel 120 and the backlight assembly 400, and may further include the gate driving part 140, the data driving part 150, the timing controlling part 360 and the backlight assembly driving part 370. The gate driving part 140, the data driving part 150 and the timing controlling part 360 may be defined as a display panel driving apparatus driving the display panel 120.

The display panel 120 receives the data signal DS based on a second image data DATA2 generated from the first image data DATA1 by the timing controlling part 360 to display the image. The display panel 120 includes the gate lines GL, the data lines DL and the pixels P. Each of the pixels P includes the thin film transistor 123 electrically connected to the gate line GL and the data line DL, the liquid crystal capacitor 124 and the storage capacitor 125 connected to the thin film transistor 121.

The gate driving part 140 generates the gate signal GS in response to the gate start signal STV and the gate clock signal CPV1 provided from the timing controlling part 360, and outputs the gate signal GS to the gate line GL.

The data driving part 150 outputs the data signal DS to the data line DL in response to the data start signal STH and the data clock signal CPV2 provided from the timing controlling part 360.

The backlight assembly 400 provides the second light L2 and the third light L3 to the display panel 120. The second light L2 may be generated from the light emitting module 410 of the backlight assembly 400 and the third light L3 may be generated from the second light source 420 of the backlight assembly 400.

The timing controlling part 360 receives the first image data DATA1 and the control signal CON from an outside source. The control signal CON may include the horizontal synchronous signal Hsync, the vertical synchronous signal Vsync and the clock signal CLK. The timing controlling part 360 generates the data start signal STH using the horizontal synchronous signal Hsync and outputs the data start signal STH to the data driving part 150. In addition, the timing controlling part 360 generates the gate start signal STV using the vertical synchronous signal Vsync and outputs the gate start signal STV to the gate driving part 140. In addition, the timing controlling part 360 generates the gate clock signal CPV1 and the data clock signal CPV2 using the clock signal CLK, outputs the gate clock signal CPV1 to the gate driving part 140 and outputs the data clock signal CPV2 to the data driving part 150. In addition, the timing controlling part 360 may further output a light source control signal LSC linked with the second image data DATA2 to the backlight assembly driving part 370.

Figure 7:
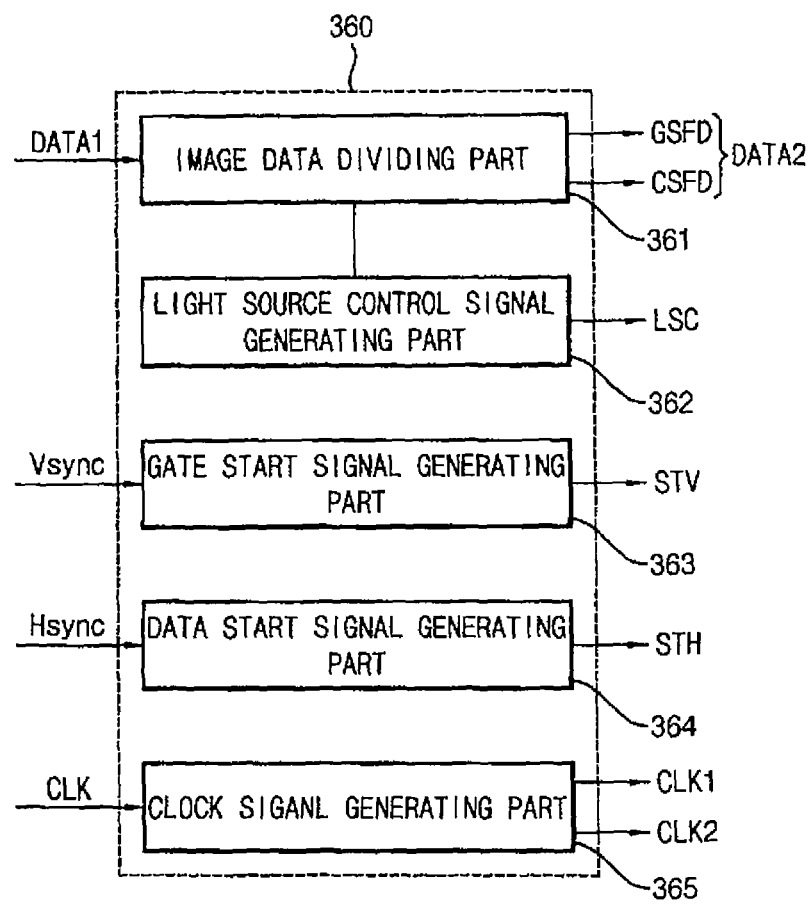
FIG. 7 is a block diagram illustrating a timing controlling part of FIG. 6.

FIG. 7 is a block diagram illustrating the timing controlling part 360 of FIG. 6.

Referring to FIGS. 6 and 7, the timing controlling part 360 includes an image data dividing part 361, a light source control signal generating part 362, a gate start signal generating part 363, a data start signal generating part 364 and a clock signal generating part 365.

The image data dividing part 361 generates a gray sub frame image data GSFD having a minimum value of red, green and blue data in the first image data DATA1 applied from the outside source. In addition, the image data dividing part 361 generates a color sub frame image data CSFD except for the gray sub frame image data in the first image data DATA1. The gray sub frame image data GSFD and the color sub frame image data CSFD may be the second image data DATA2 provided to the data driving part 150.

The data driving part 150 may sequentially output a data signal based on the gray sub frame image data GSFD and a data signal based on the color sub frame image data CSFD. Thus, the display panel 120 may sequentially display the gray sub frame image data GSFD and the color sub frame image data CSFD.

The light source control signal generating part 362 generates the light source control signal LSC linked with the second image data DATA2.

The gate start signal generating part 363 generates the gate start signal STV using the vertical synchronous signal Vsync applied from the outside source to output the gate start signal SW to the gate driving part 140.

The data start signal generating part 364 generates the data start signal STH using the horizontal synchronous signal Hsync applied from the outside source to output the data start signal STH to the data driving part 150.

The clock signal generating part 365 generates the first clock signal CLK1 and the second clock signal CLK2 using the clock signal CLK to output the first clock signal CPV1 to the data driving part 150 and output the second clock signal CPV2 to the gate driving part 140.

Referring to FIGS. 4 to 6 again, the backlight assembly driving part 370 outputs a first light source driving signal LSD1 and a second light source driving signal LSD2 to the backlight assembly 400. The backlight assembly driving part 370 may output the first light source driving signal LSD1 according to the light source control signal LSC provided from the timing controlling part 360 to drive each of the second light sources 420 included in the backlight assembly 400. In addition, the backlight assembly driving part 370 may output the second light source driving signal LSD2 according to the light source control signal LSC provided from the timing controlling part 360 to drive each of the first light sources 411 included in the backlight assembly 400.

Figure 8:
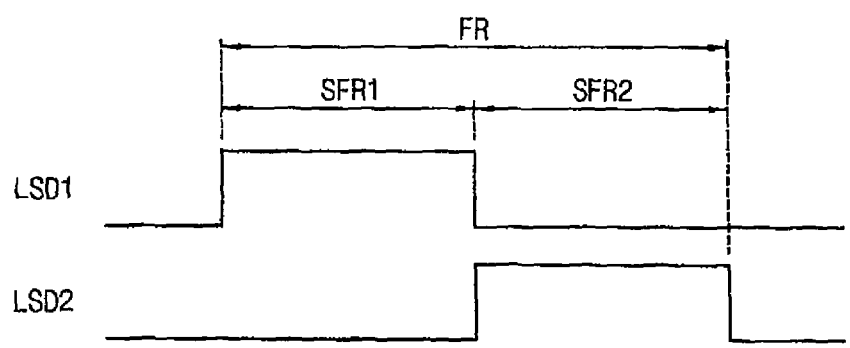
FIG. 8 is a timing diagram illustrating a first light source driving signal and a second light source driving signal of FIG. 6.

FIG. 8 is a timing diagram illustrating the first light source driving signal LSD1 and the second light source driving signal LSD2 of FIG. 6.

Referring to FIGS. 4 to 8, a frame FR includes a first sub frame SFR1 and a second sub frame SFR2. The gray sub frame image data GSFD is displayed on the display panel 120 during the first sub frame SFR1 and the color sub frame image data CSFD is displayed on the display panel 120 during the second sub frame SFR2.

The first light source driving signal LSD1 is activated during the first sub frame SFR1 and is deactivated during the second sub frame SFR2, and the second light source driving signal LSD2 is activated during the second sub frame SFR2 and is deactivated during the first sub fame SFR1. Therefore, the second light source 420 is driven during only the first sub frame and the first light source 411 included in the light emitting module 410 is driven during only the second sub frame SFR2. Thus, the quantum dot rail 412 included in the light emitting module 410 is driven during only the second sub frame SFR2.

Figure 9:
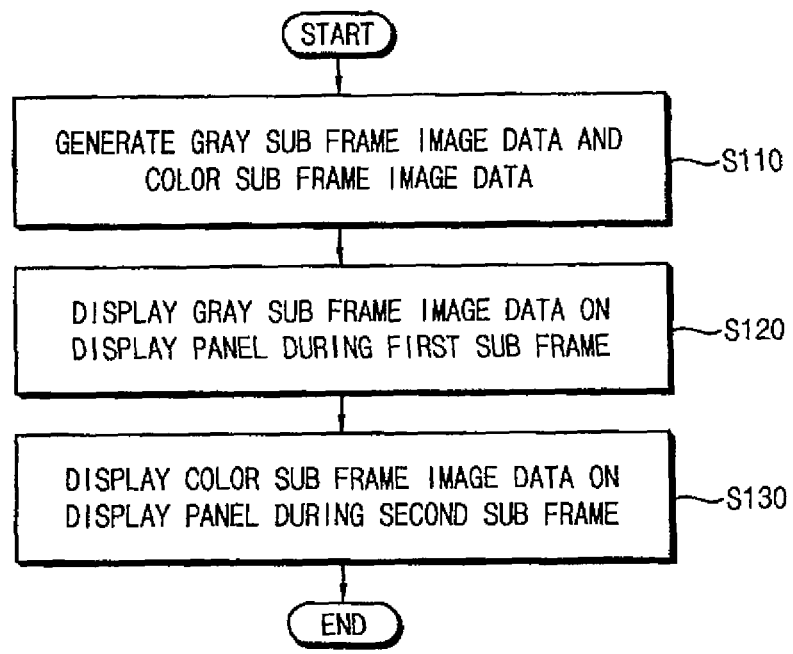
FIG. 9 is a flowchart illustrating a method of driving a display panel performed by a display panel driving apparatus of FIG. 6.

FIG. 9 is a flowchart illustrating a method of driving a display panel performed by the display panel driving apparatus of FIG. 6.

Referring to FIGS. 6, 7 and 9, the gray sub frame image data GSFD and the color sub frame image data CSFD are generated (step S110). Specifically, the timing controlling part 360 generates the gray sub frame image data GSFD having the minimum value of the red, green and blue data in the first image data DATA1. In addition, the timing controlling part 360 generates the color sub frame image data CSFD except for the gray sub frame image data in the first image data DATA1.

The gray sub frame image data GSFD is displayed on the display panel 120 during the first sub frame SFR1 (step S120). Specifically, the data driving part 150 outputs the data signal based on the gray sub frame image data GSFD to the data line DL during the first sub frame SFR1.

The color sub frame image data CSFD is displayed on the display panel 120 during the second sub frame SFR2 (step S130). Specifically, the data driving part 150 outputs the data signal based on the color sub frame image data CSFD to the data line DL during the second sub frame SFR2.

Figure 10:
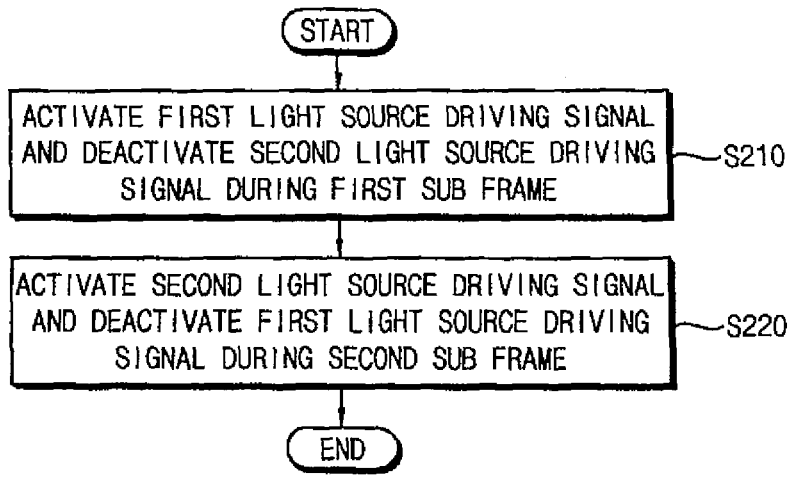
FIG. 10 is a flowchart illustrating a method of driving a backlight assembly performed by a backlight assembly driving part of FIG. 6.

FIG. 10 is a flowchart illustrating a method of driving the backlight assembly 400 performed by the backlight assembly driving part 370 of FIG. 6.

Referring to FIGS. 6, 8 and 10, the first light source driving signal LSD1 is activated and the second light source driving signal LSD2 is deactivated during the first sub frame SFR1 (step S210). The gray sub frame image data GSFD is displayed on the display panel 120 during the first sub frame SFR1. The first light source driving signal LSD1 is activated and the second light source driving signal LSD2 is deactivated during the first sub frame SFR1, therefore the second light source 420 is driven and the first light source 411 is not driven. Thus, the quantum dot rail 412 is not driven during the first sub frame SFR1.

The second light source driving signal LSD2 is activated and the first light source driving signal LSD1 is deactivated during the second sub frame SFR2 (step S220). The color sub frame image data CSFD is displayed on the display panel 120 during the second sub frame SFR2. The second light source driving signal LSD2 is activated, the first light source driving signal LSD1 is deactivated during the second sub frame SFR2, and thus the first light source 411 and the quantum dot rail 412 are driven.

In the present exemplary embodiment, the gray sub frame image data GSFD is displayed on the display panel 120 during the first sub frame SFR1 and the color sub frame image data CSFD is displayed on the display panel 120 during the second sub frame SFR2, but it is not limited thereto. For example, the color sub frame image data CSFD may be displayed on the display panel 120 during the first sub frame SFR1 and the gray sub frame image data GSFD may be displayed on the display panel 120 during the second sub frame SFR2.

In addition, in the present exemplary embodiment, the first light source driving signal LSD1 is activated during the first sub frame SFR1 and is deactivated during the second sub frame SFR2, and the second light source driving signal LSD2 is activated during the second sub frame SFR2 and is deactivated during the first sub frame SFR1, but it is not limited thereto. For example, the second light source driving signal LSD2 may be activated during the first sub frame SFR1 and may be deactivated during the second sub frame SFR2, and the first light source driving signal LSD1 may be activated during the second sub frame SFR2 and may be deactivated during the first sub frame SFR1.

In addition, in the present exemplary embodiment, the first light source driving signal LSD1 is deactivated during the second sub frame SFR2, but the first light source driving signal LSD1 driving the second light source 420 may be activated during the first sub frame SFR1 and the second sub frame SFR2. Thus, the first light source driving signal LSD1 may be activated during the frame FR.

According to the present exemplary embodiment, the quantum dot rail 412 is not driven during the first sub frame SFR1, and is driven during the second sub frame SFR2, and thus reliability of the light emitting module 410 including the quantum dot rail 412 may be improved.

Figure 11:
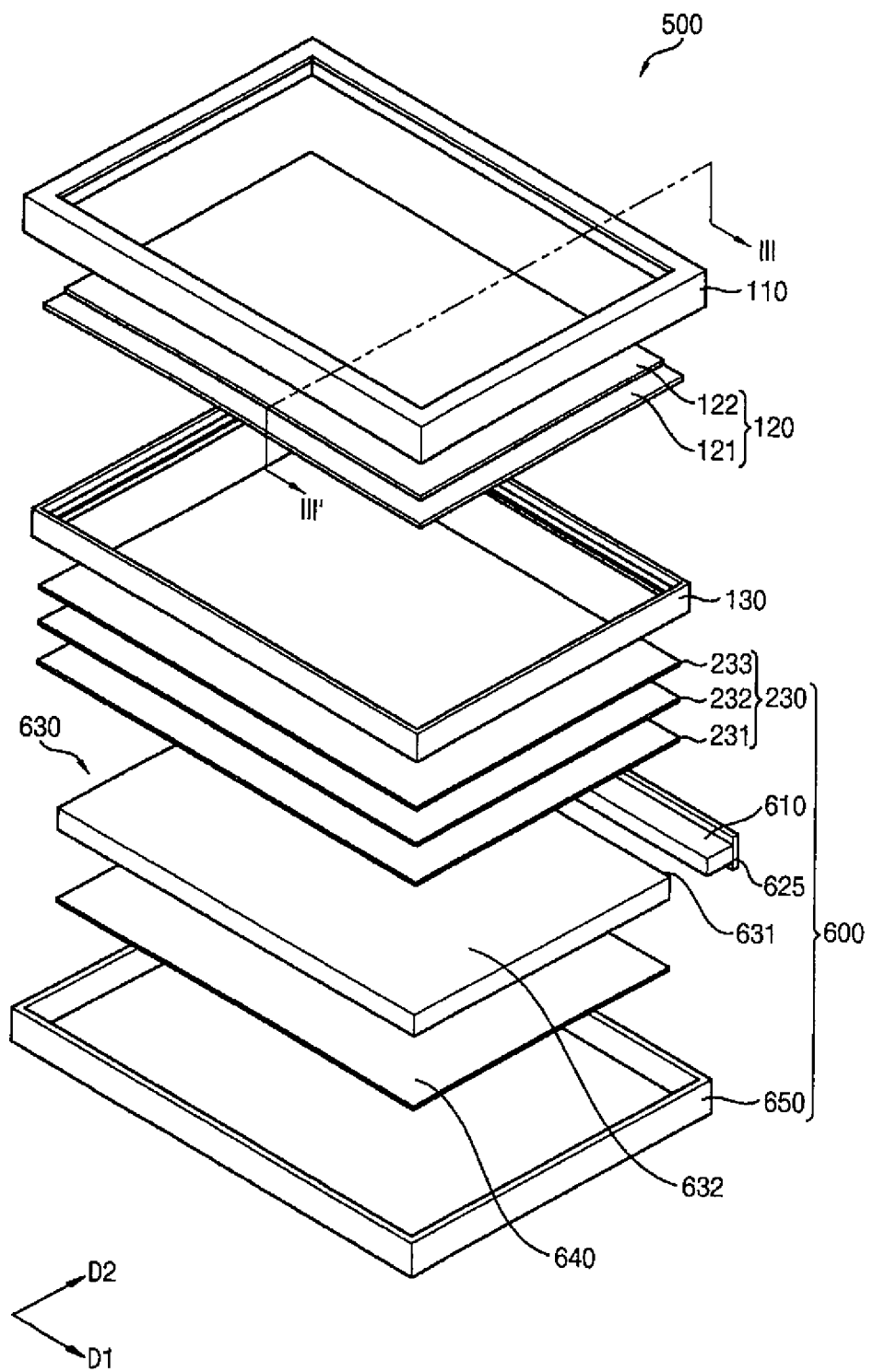
FIG. 11 is an exploded perspective view illustrating a display apparatus according to still another exemplary embodiment of the present invention.
Figure 12:
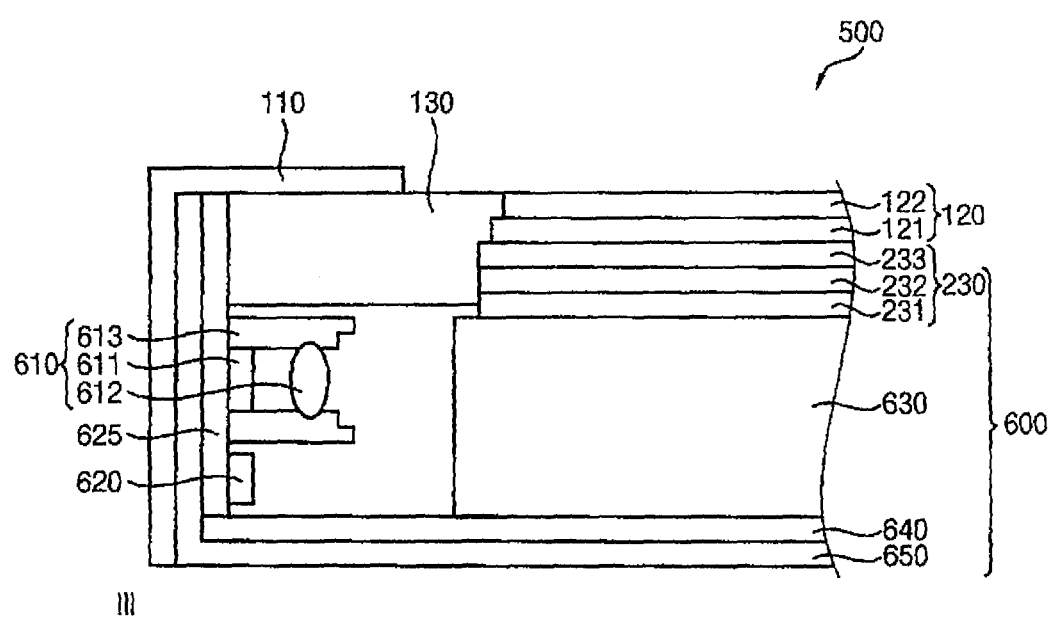
FIG. 12 is a cross-sectional view taken along a line III-III' of FIG. 11.

FIG. 11 is an exploded perspective view illustrating a display apparatus according to still another exemplary embodiment of the present invention, and FIG. 12 is a cross-sectional view taken along a line III-III' of FIG. 11.

The display apparatus 500 according to the present exemplary embodiment is substantially the same as the display apparatus 300 illustrated in FIG. 4 except for a backlight assembly 600. Thus, the same reference numerals are used to refer to same or like parts as those described in the previous embodiment and any further repetitive explanation concerning the above elements has been omitted.

Referring to FIGS. 11 and 12, the display apparatus 500 according to the present exemplary embodiment includes the upper receiving container 110, the display panel 120 and the backlight assembly 600.

The upper receiving container 110 is disposed over the display panel 120 to protect the display panel 120 from external impact, and a window is formed through the upper receiving container 110 to expose the display area of the display panel 120.

The display panel 120 includes the lower substrate 121, the upper substrate 122 and the liquid crystal layer (not shown).

The backlight assembly 600 is disposed under the display panel 120 to provide light to the display panel 120. The backlight assembly 600 includes a light emitting module 610, a second light source 620, a printed circuit board 625, a light guide plate 630, a reflection plate (a reflection sheet) 640, the optical sheets 230 and a lower receiving container 650.

The light emitting module 610 includes a first light source 611, a quantum dot rail 612 and a holding portion 613.

The first light source 611 may be substantially the same as the first light source 411 of FIG. 5. Thus, the first light source 611 generates a first light, and the first light may be a blue light. For example, the first light source 611 may be a blue light emitting diode (LED) generating the blue light.

The quantum dot rail 612 may be substantially the same as the quantum dot rail 412 of FIG. 5. Thus, the quantum dot rail 612 receives the first light, and generates a second light from the first light. The second light may be a white light.

The holding portion 613 holds the first light source 611 and the quantum dot rail 612. The holding portion 613 has an opening facing the light guide plate 630. Thus, the second light may be provided to the light guide plate 630. For example, the holding portion 613 may include glass material.

The second light source 620 is disposed at a side portion of the light emitting module 610. The second light source 620 may be substantially the same as the second light source 420 of FIG. 5. Thus, the second light source 620 generates a third light, and the third light may be a white light substantially the same as the second light. For example, the second light source 620 may be a white light emitting diode (LED) generating the white light. There may be a plurality of the second light sources 620, and in this case, the second light sources 620 may be disposed along the first direction D1 in which the light emitting module 610 extends.

The printed circuit board 625 includes signal lines supplying driving voltages to the first light source 611 and the second light source 620.

The light guide plate 630 is disposed at a side of the light emitting module 610 and the second light source 620, and includes a side surface 631 receiving the second light generated from the light emitting module 610 and an exiting surface 632 exiting the second light and the third light received through the side surface 631 to the display panel 120. Thus, the backlight assembly 600 may be an edge type backlight assembly.

The reflection sheet 640 is disposed between the light guide plate 630 and the lower receiving container 650 and between the second light source 620 and the lower receiving container 650, and reflects the second light leaked from the light emitting module 610, the third light leaked from the second light source 620 and light leaked from the light guide plate 630.

The optical sheets 230 are disposed over the light guide plate 630 to enhance efficiency of the second light and the third light exited from the light guide plate 630. The optical sheets 230 may include the first optical sheet 231, the second optical sheet 232 and the third optical sheet 233, and for example, respectively, the first optical sheet 231, the second optical sheet 232 and the third optical sheet 233 may be a diffusion sheet, a prism sheet and a light-condensing sheet.

The lower receiving container 650 is combined with the upper receiving container 110 to receive the light emitting module 610, the second light source 620, the light guide plate 630, the reflection sheet 640, the optical sheets 230 and the display panel 120.

The display apparatus 500 may further include the mold frame 130. The mold frame 130 is disposed between the display panel 120 and the optical sheets 230 to support the display panel 120, and the mold frame 130 fixes the optical sheets 230 to the lower receiving container 210.

A method of driving the backlight assembly 600 including the light emitting module 610 and the second light source 620 is substantially the same as the method of driving the backlight assembly in FIG. 10. Thus, the first light source 611 and the quantum dot rail 612 may not be driven during a first sub frame, and the first light source 611 and the quantum dot rail 612 may be driven during only a second sub frame.

According to the present exemplary embodiment, the quantum dot rail 612 is not driven during the first sub frame, driven during only the second sub frame, and thus reliability of the light emitting module 610 including the quantum dot rail 612 may be improved.

Figure 13:
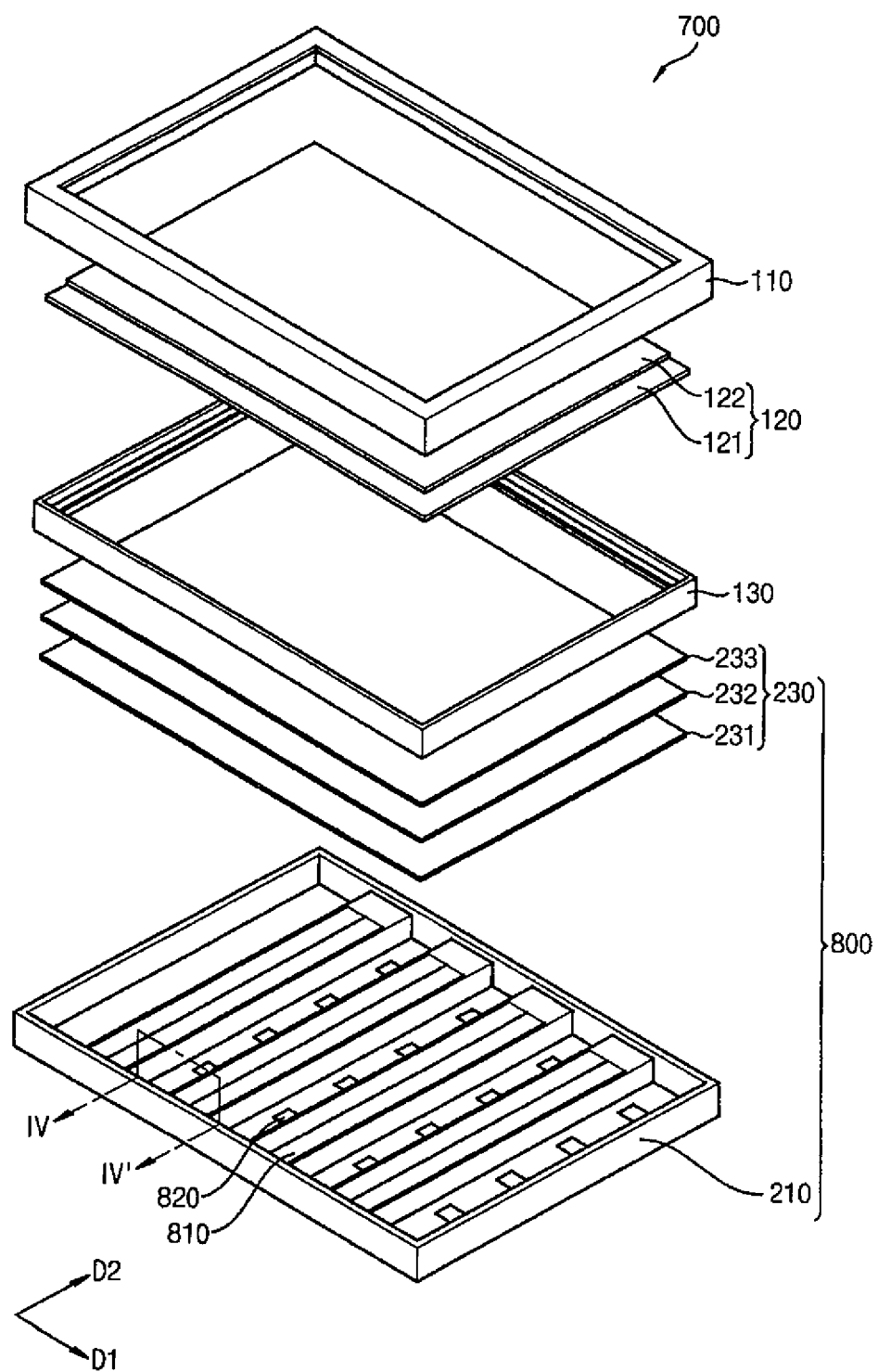
FIG. 13 is an exploded perspective view illustrating a display apparatus according to still another exemplary embodiment of the present invention.
Figure 14:
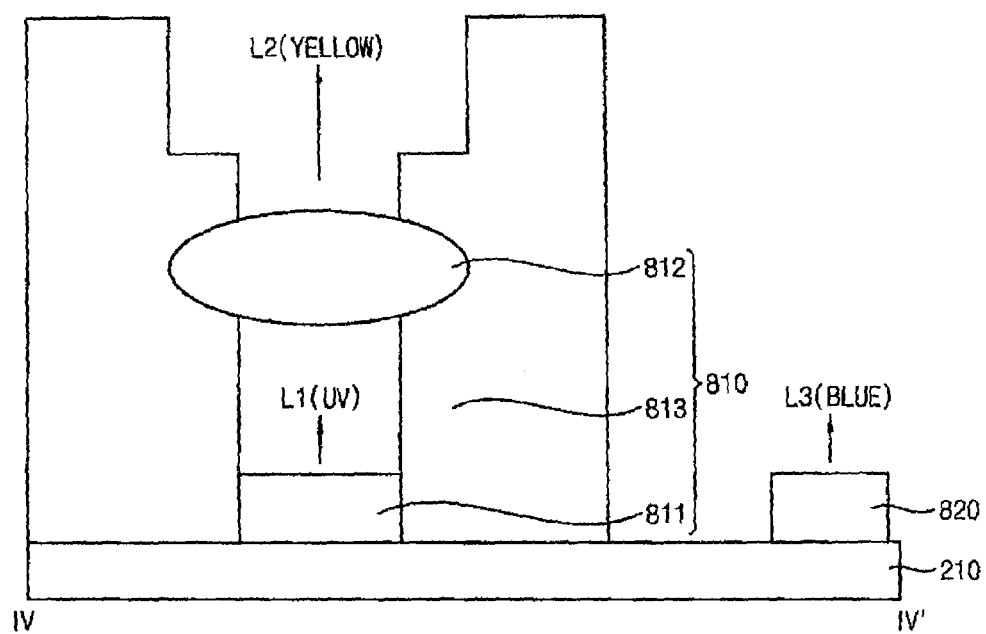
FIG. 14 is a cross-sectional view taken along a line IV-IV' of FIG. 13.

FIG. 13 is an exploded perspective view illustrating a display apparatus according to still another exemplary embodiment of the present invention, and FIG. 14 is a cross-sectional view taken along a line IV-IV' of FIG. 13.

The display apparatus 700 according to the present exemplary embodiment is substantially the same as the display apparatus 300 illustrated in FIGS. 4 and 5 except for backlight assembly 800. Thus, the same reference numerals have been used to refer to same or like parts as those described in the previous embodiment and any further repetitive explanation concerning the above elements has been omitted.

Referring to FIGS. 13 and 14, the display apparatus 700 according to the present exemplary embodiment includes the upper receiving container 110, the display panel 120 and the backlight assembly 800.

The upper receiving container 110 is disposed over the display panel 120 to protect the display panel 120 from external impact, and a window is formed through the upper receiving container 110 to expose the display area of the display panel 120.

The display panel 120 includes the lower substrate 121, the upper substrate 122 and the liquid crystal layer (not shown).

The backlight assembly 800 is disposed under the display panel 120 to provide light to the display panel 120. The backlight assembly 800 includes the lower receiving container 210, a light emitting module 810, a second light source 820 and optical sheets 230.

The lower receiving container 210 is combined with the upper receiving container 110 to receive the light emitting module 810, the second light source 820, the optical sheets 240 and the display panel 120.

The light emitting module 810 is disposed under the display panel 120 and generates the light to the display panel 120. Thus, the backlight assembly 800 may be an edge type backlight assembly.

Specifically, the light emitting module 810 includes a first light source 811, a quantum dot rail 812 and a holding portion 813.

The first light source 811 generates a first light L1. The first light L1 may be an ultraviolet light. For example, the first light source 811 may be an ultraviolet ray light emitting diode (LED) generating the ultraviolet light.

The quantum dot rail 812 receives the first light L1, and generates a second light L2 from the first light L1. The second light L2 may be a yellow light.

The holding portion 813 holds the first light source 811 and the quantum dot rail 812. The holding portion 813 has an opening facing the display panel 120. Thus, the second light L2 may be provided to the display panel 120. For example, the holding portion 813 may include glass material.

There may be a plurality of light emitting modules 810. Thus, the light emitting modules 810 may include a plurality of the first light sources 811 and a plurality of the quantum dot rails 812 respectively disposed on the first light sources 811. For example, each of the light emitting modules 810 may extend in the second direction D2 and may be aligned in the first direction D1. Alternatively, each of the light emitting modules 810 may extend in the first direction D1 and may be aligned in the second direction D2. The light emitting modules 810 may be uniformly disposed with respect to one another.

There may be a plurality of second light sources 820 is disposed at a side portion of the light emitting module 810. Thus, the backlight assembly 800 may include a plurality of the second light sources 820 corresponding to each of the light emitting modules 810. For example, four second light sources 820 may correspond to each of the light emitting modules 810. The second light source 820 generates a third light L3 to provide the third light L3 to the display panel 120. The third light L3 generated from the second light source 820 may be a blue light. For example, the second light source 820 may be a blue light emitting diode (LED) generating the blue light.

The light emitting module 810 generates the yellow light including a red light and a green light, and the second light source 820 generates the blue light, therefore the light emitting module 810 and the second light source 820 may generate a white light.

The light emitting module 810 and the second light source 820 may be individually driven, and may be driven in a dimming driving method. For example, when an image data displayed on the display panel 120 includes red data and green data except for blue data, the second light source 820 may not be driven and only the light emitting module 810 may be driven, and when the image data displayed on the display panel 120 includes blue data except for red data and green data, the light emitting module 810 may not be driven and only the second light source 820 may be driven.

The optical sheets 230 are disposed over the light emitting module 810 and the second light source 820 to enhance efficiencies of the second light L2 exited from the light emitting module 810 and the third light L3 exited from the second light source 820. The optical sheets 230 may include a first optical sheet 231, a second optical sheet 232 and a third optical sheet 233, and for example, respectively, the first optical sheet 231, the second optical sheet 232 and the third optical sheet 233 may be a diffusion sheet, a prism sheet and a light-condensing sheet.

The display apparatus 700 may further include the mold frame 130. The mold frame 130 is disposed between the display panel 120 and the optical sheets 230 to support the display panel 120, and the mold frame 130 fixes the optical sheets 230 to the lower receiving container 210.

According to the present exemplary embodiment, the ultraviolet light instead of the blue light is used as an exitation light of the quantum dot rail 812, and thus efficiency of light of the light emitting module 810 may be increased.

Figure 15:
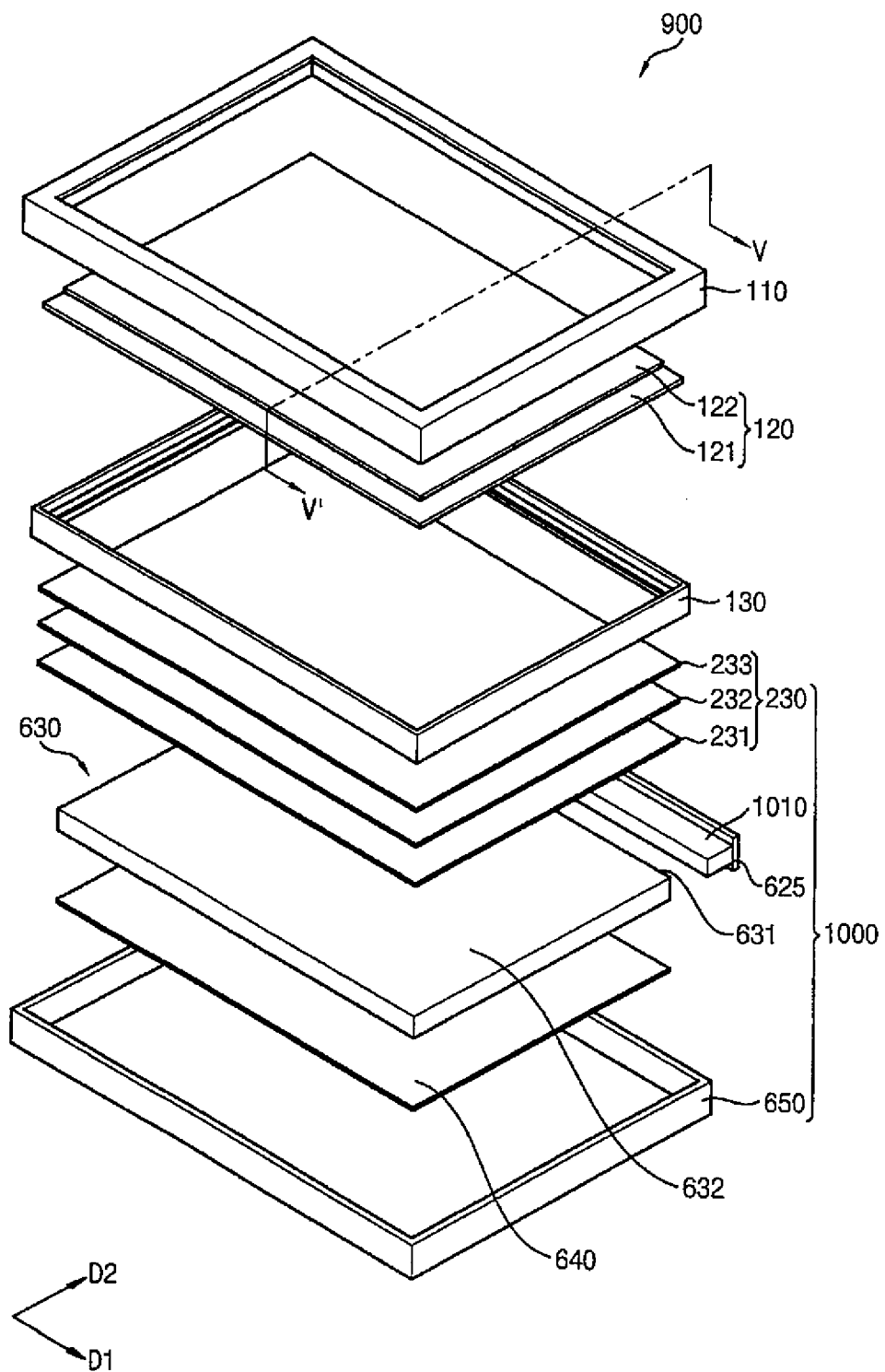
FIG. 15 is an exploded perspective view illustrating a display apparatus according to still another exemplary embodiment of the present invention.
Figure 16:
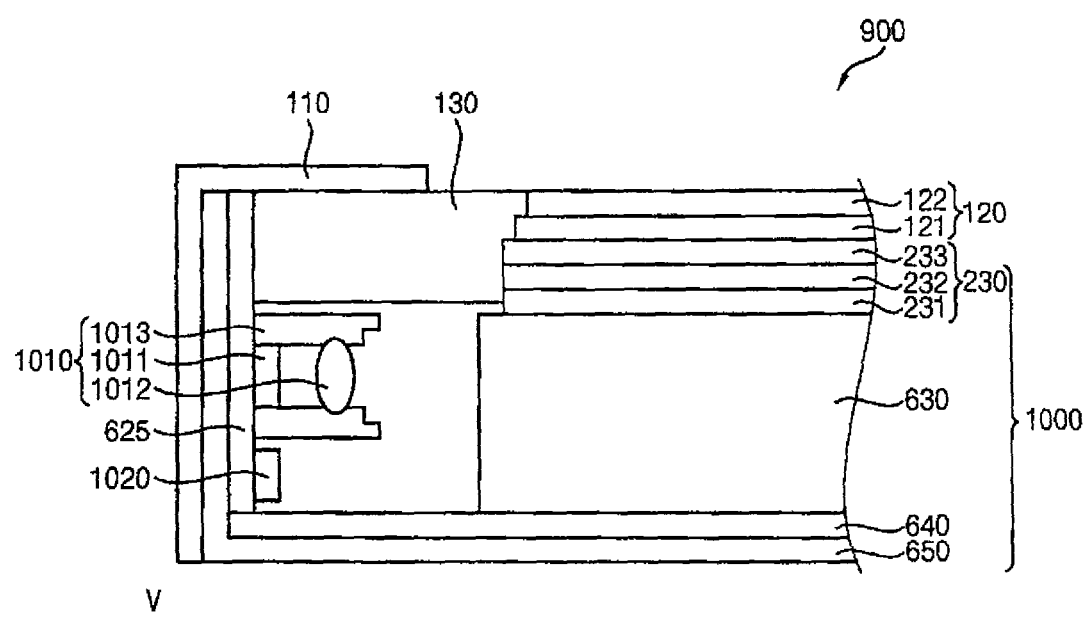
FIG. 16 is a cross-sectional view taken along a line III-III' of FIG. 15.

FIG. 15 is an exploded perspective view illustrating a display apparatus according to still another exemplary embodiment of the present invention, and FIG. 16 is a cross-sectional view taken along a line III-III' of FIG. 15.

The display apparatus 900 according to the present exemplary embodiment is substantially the same as the display apparatus 500 illustrated in FIGS. 11 and 12 except for a backlight assembly 1000. Thus, the same reference numerals will be used to refer to same or like parts as those described in the previous embodiment and any further repetitive explanation concerning the above elements has been omitted.

Referring to FIGS. 15 and 16, the display apparatus 900 according to the present exemplary embodiment includes the upper receiving container 110, the display panel 120 and the backlight assembly 1000.

The upper receiving container 110 is disposed over the display panel 120 to protect the display panel 120 from external impact, and a window is formed through the upper receiving container 110 to expose the display area of the display panel 120.

The display panel 120 includes the lower substrate 121, the upper substrate 122 and the liquid crystal layer (not shown).

The backlight assembly 1000 is disposed under the display panel 120 to provide light to the display panel 120. The backlight assembly 1000 includes a light emitting module 1010, a second light source 1020, a printed circuit board 625, a light guide plate 630, a reflection plate 640, optical sheets 230 and a lower receiving container 650.

The light emitting module 1010 includes a first light source 1011, a quantum dot rail 1012 and a holding portion 1013.

The first light source 1011 may be substantially the same as the first light source 811 of FIG. 14. Thus, the first light source 1011 generates a first light, and the first light may be an ultraviolet light. For example, the first light source 1011 may be an ultraviolet ray light emitting diode (LED) generating the ultraviolet light.

The quantum dot rail 1012 may be substantially the same as the quantum dot rail 812 of FIG. 14. Thus, the quantum dot rail 1012 receives the first light, and generates a second light from the first light. The second light may be a yellow light.

The holding portion 1013 holds the first light source 1011 and the quantum dot rail 1012. The holding portion 1013 has an opening facing the light guide plate 630. Thus, the second light may be provided to the light guide plate 630. For example, the holding portion 1013 may include glass material.

The second light source 1020 is disposed at a side portion of the light emitting module 1010. The second light source 1020 may be substantially the same as the second light source 820 of FIG. 14. Thus, the second light source 1020 generates a third light, and the third light may be a blue light. For example, the second light source 1020 may be a blue light emitting diode (LED) generating the blue light. There may be a plurality of second light sources 1020, and in this embodiment, the second light sources 1020 may be disposed along the first direction D1 in which the light emitting module 1010 extends.

The light emitting module 1010 and the second light source 1020 may be individually driven, and may be driven in a dimming driving method. For example, when an image data displayed on the display panel 120 includes red data and green data except for blue data, the second light source 1020 may not be driven and only the light emitting module 1010 may be driven, and when the image data displayed on the display panel 120 includes blue data except for red data and green data, the light emitting module 1010 may not be driven and only the second light source 1020 may be driven.

The printed circuit board 625 includes signal lines supplying driving voltages to the first light source 1011 and the second light source 1020.

The light guide plate 630 is disposed at a side of the light emitting module 1010 and the second light source 1020, and includes the side surface 631 receiving the second light generated from the light emitting module 1010 and the exiting surface 632 exits the second light and the third light received through the side surface 631 to the display panel 120. Thus, the backlight assembly 1000 may be an edge type backlight assembly.

The reflection sheet 640 is disposed between the light guide plate 630 and the lower receiving container 650 and between the second light source 1020 and the lower receiving container 650, and reflects the second light leaked from the light emitting module 1010, the third light leaked from the second light source 1020 and light leaked from the light guide plate 630.

The optical sheets 230 are disposed over the light guide plate 630 to enhance efficiency of the second light and the third light exited from the light guide plate 630. The optical sheets 230 may include the first optical sheet 231, the second optical sheet 232 and the third optical sheet 233, and for example, respective the first optical sheet 231, the second optical sheet 232 and the third optical sheet 233 may be the diffusion sheet, the prism sheet and the light-condensing sheet.

The lower receiving container 650 is combined with the upper receiving container 110 to receive the light emitting module 1010, the second light source 1020, the light guide plate 630, the reflection sheet 640, the optical sheets 230 and the display panel 120.

The display apparatus 900 may further include the mold frame 130. The mold frame 130 is disposed between the display panel 120 and the optical sheets 230 to support the display panel 120, and the mold frame 130 fixes the optical sheets 230 to the lower receiving container 210.

According to the present exemplary embodiment, the ultraviolet light instead of the blue light is used as an exitation light of the quantum dot rail 1012, and thus efficiency of light of the light emitting module 1010 may be increased.

According to the backlight assembly and the display apparatus having the backlight assembly, a light emitting module including a quantum dot rail is disposed under a display panel, and thus a width of a bezel of the display apparatus may be decreased.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A backlight assembly comprising:
   a light emitting module comprising a first light source configured to generate a first light, a quantum dot rail configured to generate a second light from the first light, and a second light source configured to generate a third light, the light emitting module being disposed under a display panel to provide the display panel with the second light, wherein the display panel is configured to display an image; and
   a lower receiving container configured to receive the light emitting module and the display panel.

2. The backlight assembly of claim 1, wherein the light emitting module further comprises a holding portion configured to hold the first light source and the quantum dot rail, the holding portion has an opening facing the display panel.

3. The backlight assembly of claim 1, wherein there are a plurality of the light emitting modules comprising the light emitting module, wherein the backlight assembly further comprises light emitting blocks respectively corresponding to the plurality of light emitting modules, and the light emitting modules are driven in a dimming driving method.

4. The backlight assembly of claim 1, wherein the light emitting module comprises a plurality of the first light sources and a plurality of the quantum dot rails respectively disposed on the first light sources.

5. The backlight assembly of claim 4, wherein currents of light source driving signals respectively driving the first light sources are controlled.

6. The backlight assembly of claim 4, wherein pulse widths of light source driving signals respectively driving the first light sources are controlled.

7. The backlight assembly of claim 1, wherein the first light is a blue light.

8. The backlight assembly of claim 7, wherein the second light is a white light.

9. The backlight assembly of claim 8, wherein the third light is a white light.

10. The backlight assembly of claim 9, wherein the second light source and the first light source are configured to be sequentially driven.

11. The backlight assembly of claim 10, wherein the second light source is configured to be driven in a first sub frame displaying a gray sub frame image data having a minimum value of red, green and blue data of an image data.

12. The backlight assembly of claim 11, wherein the first light source is configured to be driven in a second sub frame displaying a color sub frame image data except for the gray sub frame image data in the image data.

13. The backlight assembly of claim 1, wherein the first light is an ultraviolet light and the second light is a yellow light.

14. The backlight assembly of claim 13, wherein the third light is a blue light.

15. A backlight assembly comprising:
a light emitting module comprising a first light source configured to generate a first light, a quantum dot rail configured to generate a second light from the first light, and a second light source configured to generate a third light;
a light guide plate comprising a side surface configured to receive the second light and an exiting surface configured to exit the second light received through the side surface; and
a lower receiving container configured to receive the light emitting module, the light guide plate and a display panel, the display panel configured to receive the second light to display an image.

16. The backlight assembly of claim 15,
wherein the first light is a blue light the second light is a white light, and the third light is a white light.

17. The backlight assembly of claim 15,
wherein the first light is an ultraviolet light, the second light is a yellow light, and the third light is a blue light.

18. A display apparatus comprising:
a display panel configured to display an image; and
a backlight assembly comprising a light emitting module comprising a first light source configured to generate a first light, a quantum dot rail configured to generate a second light from the first light, and a second light source configured to generate a third light, the backlight assembly being disposed under the display panel to provide the display panel with the second light, and a lower receiving container configured to receive the light emitting module and the display panel.

19. The display apparatus of claim 18, wherein the first light is a blue light, the second light is a white light, and the third light is a second white light.

20. The display apparatus of claim 18, wherein the first light is an ultraviolet light, the second light is a yellow light, and the third light is a blue light.

\* \* \* \* \*